(12) United States Patent
Atamer et al.

(10) Patent No.: US 11,787,067 B1
(45) Date of Patent: Oct. 17, 2023

(54) SUCTION CUP DESIGN FOR VARYING PACKAGES

(71) Applicant: Amazon Technologies, Inc., Seattle, WA (US)

(72) Inventors: Bertan Atamer, Hudson, MA (US); Jude Jonas, Hudson, NH (US); Areej Pirzada, Lexington, MA (US); David Michael Lewis, Burlington, MA (US); Noah Scott Wieckowski, Boston, MA (US); Gregory Coleman, Somerville, MA (US)

(73) Assignee: Amazon Technologies, Inc., Seattle, WA (US)

( * ) Notice: Subject to any disclaimer, the term of this patent is extended or adjusted under 35 U.S.C. 154(b) by 155 days.

(21) Appl. No.: 17/328,803

(22) Filed: May 24, 2021

(51) Int. Cl.
*B25J 15/06* (2006.01)
*B25J 15/00* (2006.01)

(52) U.S. Cl.
CPC ....... *B25J 15/0683* (2013.01); *B25J 15/0052* (2013.01)

(58) Field of Classification Search
CPC . B25J 15/0616; B25J 15/0683; B66C 1/0212; B66C 1/0231; Y10S 901/40
USPC ......................................... 294/183, 185, 189
See application file for complete search history.

(56) References Cited

U.S. PATENT DOCUMENTS

| | | | | |
|---|---|---|---|---|
| 3,656,794 A | * | 4/1972 | McCord | B65B 35/18 D7/688 |
| 4,600,229 A | * | 7/1986 | Oten | B65G 47/91 294/189 |
| 5,190,332 A | * | 3/1993 | Nagai | B65G 47/91 271/90 |
| 6,193,291 B1 | * | 2/2001 | Morroney | B25B 11/007 294/189 |
| 6,527,323 B2 | * | 3/2003 | Nagai | B25J 15/0616 294/189 |
| 6,607,054 B1 | * | 8/2003 | Lindfield | F16B 47/006 248/205.8 |
| 2020/0361098 A1 | * | 11/2020 | Milhau | B25J 13/081 |
| 2021/0039268 A1 | * | 2/2021 | Anderson | B25J 15/0683 |

OTHER PUBLICATIONS

U.S. Appl. No. 17/328,736, "Suction Cup Filtration Fitting", filed May 24, 2021.

* cited by examiner

*Primary Examiner* — Dean J Kramer
(74) *Attorney, Agent, or Firm* — Eversheds Sutherland (US) LLP (57) ABSTRACT

An apparatus includes a bellows and a lip. The bellows defines an interior cavity. The lip is coupled to the bellows such that the lip is concentric with the bellows. The lip extends away from the bellows in a radial direction and in a vertical direction such that the lip forms a cup shape. The bellows and the lip define a passage from the lip through the interior cavity. The lip includes a rib on an outer surface of the lip such that the rib extends along the outer surface of the lip and away from the bellows in the radial direction and in the vertical direction.

19 Claims, 10 Drawing Sheets

SUCTION CUP DESIGN FOR VARYING PACKAGES

BACKGROUND

The present invention relates to a design for a suction device, and more specifically, to a suction device for an end effector of a robotic arm.

DETAILED DESCRIPTION

Robotic arms are used to sort, organize, and handle packages (e.g., boxes, bags, and other containers of items). The robotic arms may use suction cups to lift these packages. For example, the suction cups may create a suction effect (e.g., using a vacuum) on the packages such that the packages move with the robotic arm.

The suction effect may dislodge particles from the packages and cause these particles to get sucked into a suction cup and other parts of the robotic arm. For example, when the robotic arm is handling a cardboard box, the suction effect may dislodge cardboard particles from the cardboard box, which travel into the suction cup and other parts of the robotic arm (e.g., hoses of the robotic arm). These particles may damage or clog the suction cup or the robotic arm, rendering them inoperable.

Certain suction cups include a filter positioned within the suction cup to trap dislodged particles. These filters, however, wear down easily over time due to the movement of the suction cup and due to contact with packages, which may cause the filters to crack. When these filters wear down, it may be necessary to replace the entire suction cup.

Additionally, in some instances, the suction effect may cause the suction cup to structurally collapse and fold in on itself. When this occurs, the suction cup may be damaged and may need to be replaced. If the thickness of the suction cup is increased to strengthen the suction cup, the suction cup may become too stiff, making it difficult to pick up certain types of packages. Moreover, in some instances, the suction cup sticks to itself, which makes it difficult for the suction cup to release an item.

This disclosure contemplates a suction device for a robotic arm with one or more features that improve the longevity of the suction device. In certain embodiments, the suction device includes a fitting coupled to a suction cup. A filter is positioned within a chamber in the fitting. When the suction effect is created, air flows from the suction cup and through the fitting. The air flowing through the fitting flows through the chamber and the filter. In this manner, the fitting protects the filter from being damaged by the suction cup or packages. Additionally, the filter catches particles dislodged from the packages by the suction effect.

In some embodiments, the suction device includes a rib on a lip of the suction cup and/or ribs on a bellows of the suction cup. The rib on the lip of the suction cup extends around an inner area of the lip to strengthen the lip against collapse. The lip may extend beyond the rib to allow for flexibility at the boundary of the lip, so that the suction cup can adhere to various types of packages. The ribs on the bellows of the suction cup extend along the bellows and onto the rib on the lip. These ribs strengthen the bellows against collapse. Additionally, these ribs may prevent the bellows from contacting and sticking to itself during a suction operation.

Figure 1:
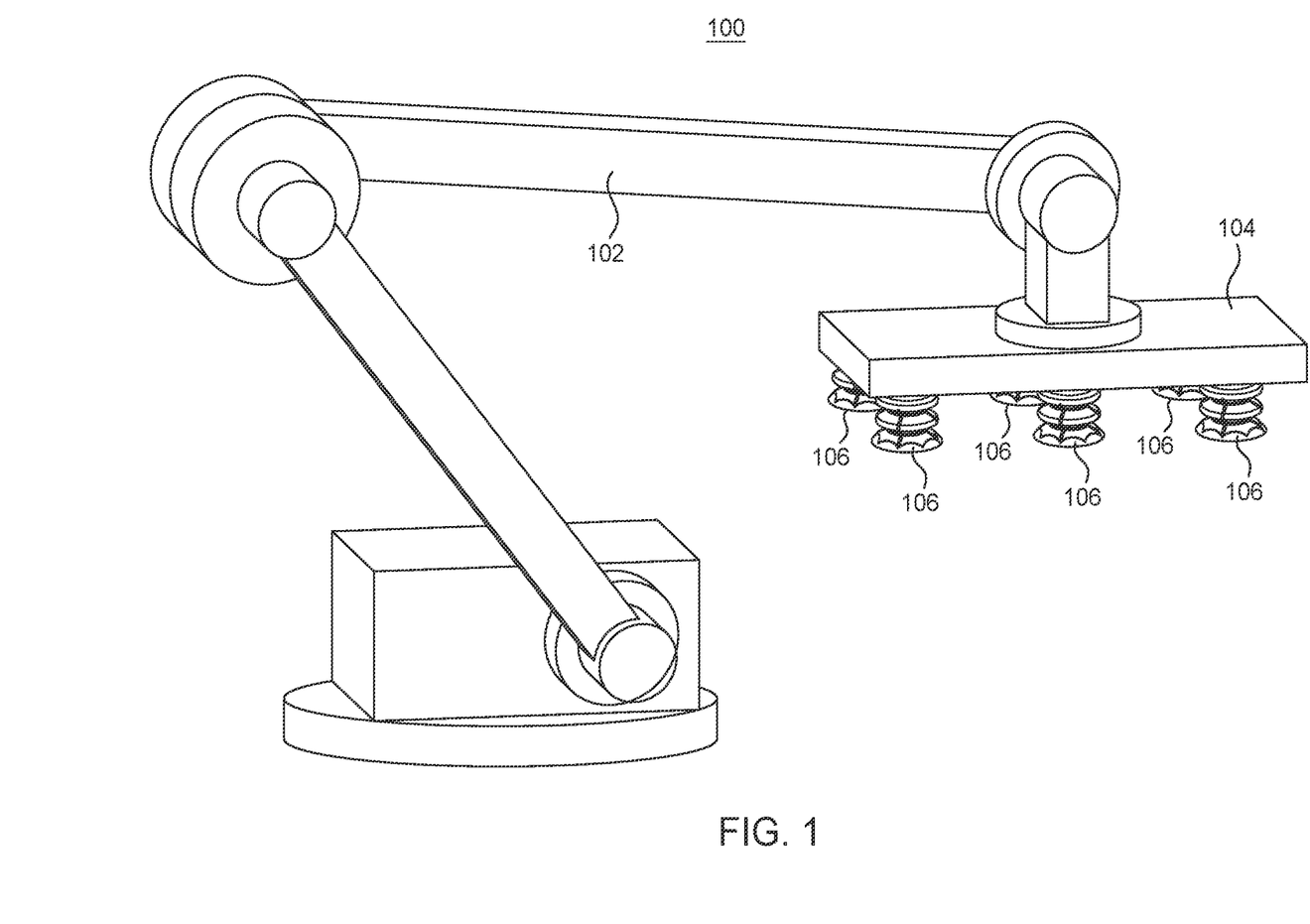
FIG. 1 illustrates an example robotic arm.

FIG. 1 illustrates an example robotic arm 100. As seen in FIG. 1, the robotic arm 100 includes an arm 102 and an end effector 104. Generally, the arm 102 is operated to move the end effector 104 towards an item. The end effector 104 may be positioned against the item to lift or manipulate the item.

The end effector 104 includes one or more suction devices 106. Each suction device 106 may be coupled to a vacuum (e.g., through a hose in the end effector 104) to cause air to be sucked in through the suction device 106. The suction devices 106 may then be positioned against an item such as a container, a box, or a bag to create a suction effect on the item. When the arm 102 lifts the end effector 104, the suction effect results in the suction devices 106 and the end effector 104 lifting the item. Various features of the suction devices 106 will be described in more detail using the subsequent figures.

Figure 2A:
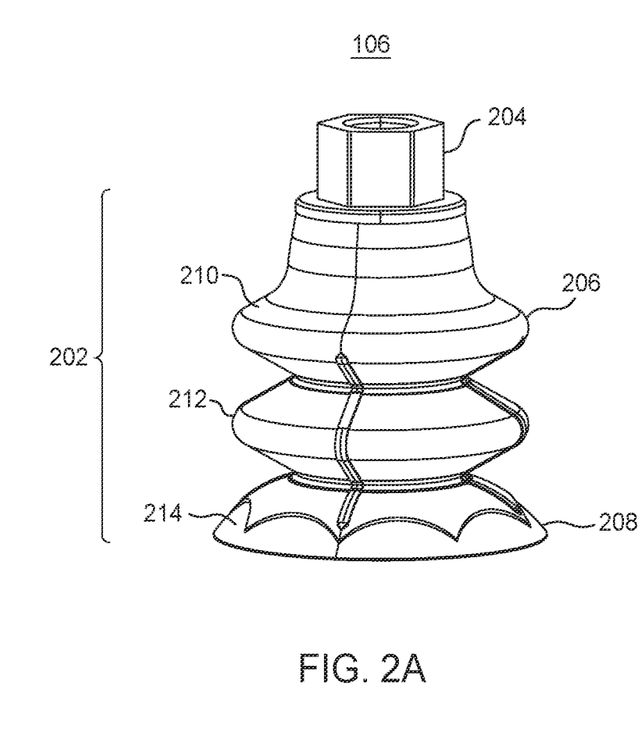
FIGS. 2A through 2D illustrate an example suction device of the robotic arm of FIG. 1.

FIG. 2A illustrates an example suction device 106 of the robotic arm 100 of FIG. 1. As seen in FIG. 2A, the suction device 106 includes a suction cup 202 and a fitting 204. The fitting 204 is coupled to a top end of the suction cup 202. The suction cup 202 may be made using a material such as silicone or rubber.

The suction cup 202 includes a bellows 206 and a lip 208. The bellows 206 includes multiple stages defined by crests, roots, and flanks connected therebetween. In the example of FIG. 2A, the bellows 206 includes two stages referred to herein as a top portion 210 located at a proximal end of the bellows 206 and a bottom portion 212 located at a distal end of the bellows 206. The fitting 204 is coupled to a top end of the top portion 210. The bottom portion 212 is coupled to a bottom end of the top portion 210. The lip 208 is coupled to a bottom end of the bottom portion 212. As a result, the top portion 210, the bottom portion 212, and the lip 208 are concentric with each other. As seen in FIG. 2A, the lip 208 extends radially outwards from the bottom portion 212 of the bellows 206 and vertically away from the bottom portion 212 of the bellows 206 to form a cup shape. The lip 208 may have any suitable shape for forming a seal against an item. For example, the lip 208 may be a flat, planar surface. As another example, the lip 208 may be a triangular or rectangular shape.

Figure 2B:
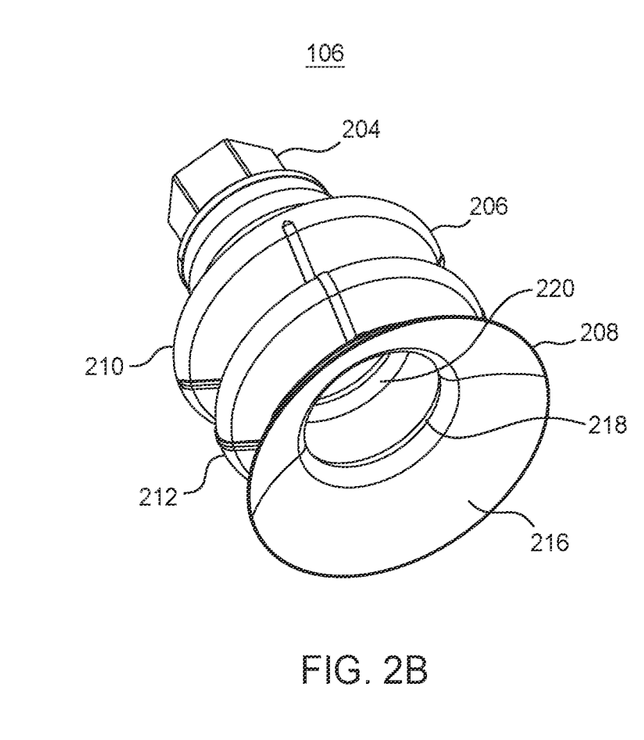

FIG. 2B illustrates an isometric view of the suction device 106 of FIG. 2A. As seen in FIG. 2B, the lip 208 includes an object contact surface 216 that is opposite an outer surface 214. When the lip 208 is positioned against an item, the object contact surface 216 may contact the item. Additionally, the top portion 210 and the bottom portion 212 of the bellows 206 define an interior cavity 220 with a bottom opening 218 in the bottom portion 212 of the bellows 206.

Figure 2C:
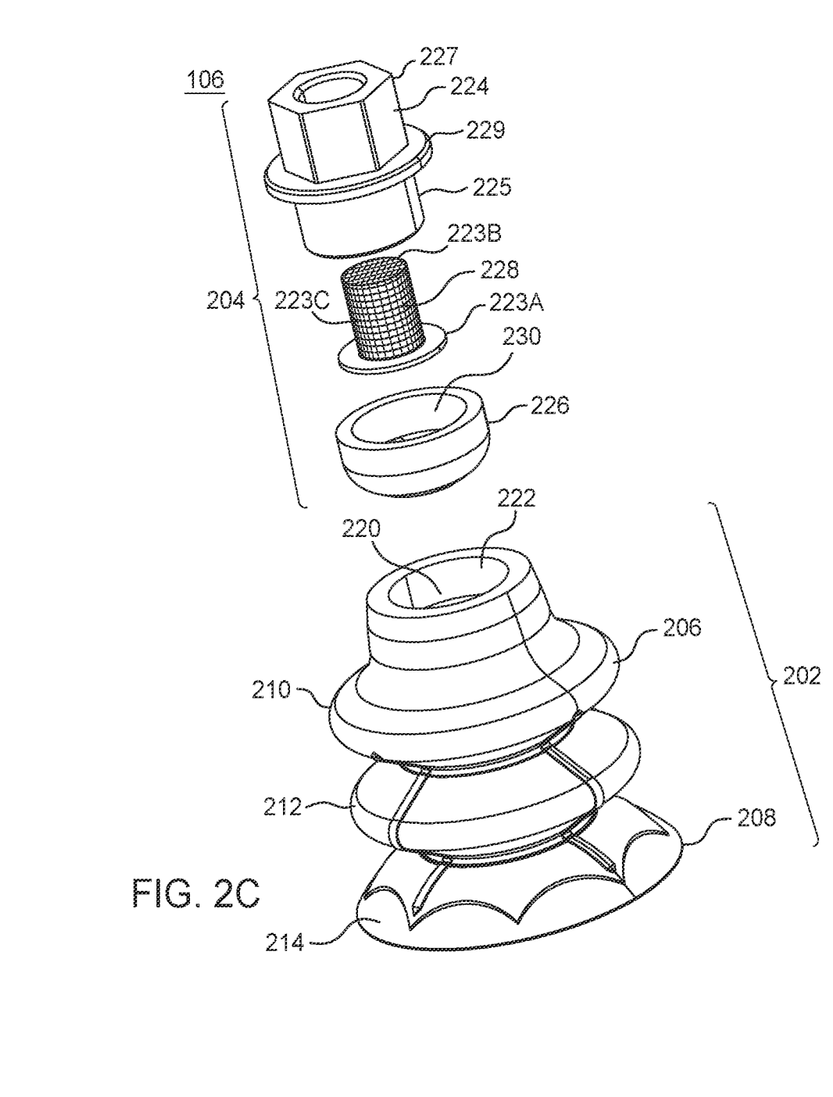

FIG. 2C illustrates an exploded view of the suction device 106 of FIG. 2A. As seen in FIG. 2C, the interior cavity 220 has an opening 222 in the top portion 210 of the bellows 206. The fitting 204 couples to the top portion 210 of the bellows 206 through the top opening 222.

Additionally, as seen in FIG. 2C, the fitting 204 includes a top portion 224, a retaining member 226, and a filter 228. The top portion 224 includes a bottom section 225, a top section 227, and a rim 229. Generally, the top portion 224 of the fitting 204 defines a chamber that is dimensioned to house the filter 228 such that the filter 228 is positioned within the top portion 224. The bottom section 225 is sized to fit through the top opening 222. The rim 229 is sized to be diametrically larger than the top opening 222 so that the rim 229 and the top section 227 do not fit through the top opening 222. The retaining member 226 serves as a bottom portion of the fitting 204 and engages the bottom section 225 to couple to the top portion 224 of the fitting 204. In this manner, the retaining member 226 and the bottom section 225 are two mating members that are sized relative to each other such that the retaining member 226 receives the bottom section 225 and such that the retaining member 226 snuggly engages the bottom section 225, thereby retaining the filter 228 within the chamber. In some embodiments, the bottom section 225 and the retaining member 226 may include threaded portions such that the retaining member 226 twists onto the bottom section 225 to couple to the top portion 224 of the fitting 204. The retaining member 226 is sized to fit through the bottom opening 218 and the interior cavity 220 of the bellows 206. The second portion 226 may be sized such that the second portion 226 does not fit through the top opening 222. As a result, the bottom section 225 may extend through the top opening 222 and into the interior cavity 220.

As seen in FIG. 2C, the filter 228 is cylindrical and includes a flange 223A, a top surface 223B, and a side surface 223C. The cylindrical portion of the filer 228 includes the top surface 223B and the side surface 223C. The top surface 223B and the side surface 223C are sized to fit within a chamber defined by the top portion 224 of the fitting 204. The flange 223A is coupled to the side surface 223C such that the flange 223A is located at an end of the side surface 223C opposite the top surface 223B. The flange 223A encircles the side surface 223C. The flange 223A has a width that is wider than the width of the chamber. In this manner, the flange 223A prevents the top and side surfaces 223B and 223C from engaging deeper into the chamber within the top portion 224.

The cylindrical shape of the filter 228 prolongs the operation of the filter 228 before the filter 228 needs to be serviced, in particular embodiments. For example, as the filter 228 catches debris, the debris collects first at the top surface 223B. When the top surface 223B is covered by debris, the top surface 223B is clogged. When the top surface 223B is clogged, the air may continue flowing through the side surface 223C of the filter 228. The side surface 223C then catches and collects debris. After the side surface 223C is clogged, the filter 228 may be serviced.

The retaining member 226 may be maneuvered through the bottom opening 218 and up through the interior cavity 220 to couple to the bottom section 225 within the interior cavity 220. The retaining member 226 then prevents the top portion 224 from disengaging the bellows 206 through the top opening 222. As a result, the fitting 204 is coupled to the bellows 206. Stated differently, to assemble the suction device 106, the retaining member 226 is inserted through the bottom opening 218 and the interior cavity 220. The bottom section 225 and the retaining member 226 are urged against each other until they shoulder out on opposite sides of the inner annular lip at the proximal end of the bellows 204. Thus, the inner annular lip is sandwiched between the rim 229 and the retaining member 226.

In some embodiments, the retaining member 226 is rounded such that the retaining member 226 defines a cavity 230 within the interior of the retaining member 226. When the retaining member 226 is coupled to the top portion 224, the cavity 230 creates space between the top portion 224 and a bottom surface of the retaining member 226.

Figure 2D:
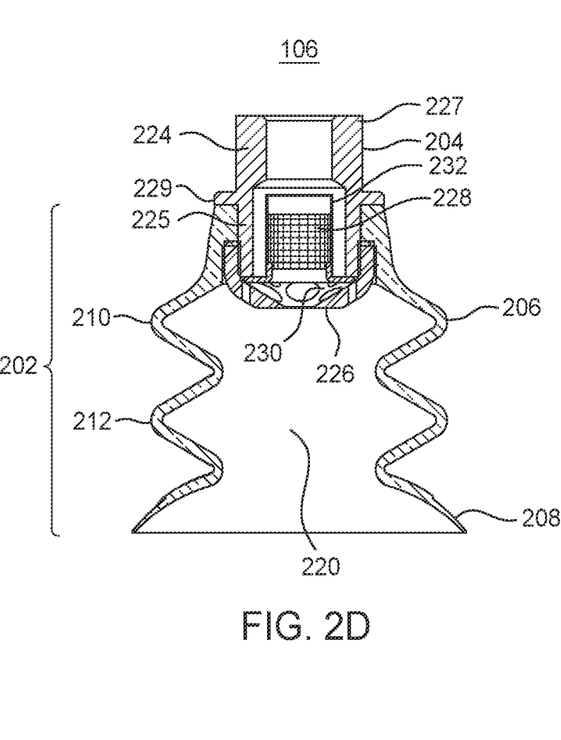

FIG. 2D illustrates a cross-sectional view of the suction device 106 of FIG. 2A. As seen in FIG. 2D, the fitting 204 has been assembled such that the fitting 204 is coupled to the bellows 206. The bottom section 225 extends through the top opening 222 and into the interior cavity 220. The rim 229 is diametrically larger than the top opening 222 and rests on a top surface of the bellows 206 such that the top portion 227 and the rim 229 are positioned outside the bellows 206, which prevents the rim 229 and the top section 227 from falling into the top opening 222. In other words, the rim 229 has a width that is larger than the width of the top opening 222. Additionally, the retaining member 226 has been maneuvered through the bottom opening 218 and the interior cavity 220 to engage with the bottom section 225. In this manner, the top portion 224 spans a width of the top opening 222, and the retaining member 226 spans a width of the interior cavity 220 that is greater than the width of the top opening 222. As a result, when the retaining member 226 is engaged with the bottom section 225, the retaining member 226 prevents the bottom section 226 from sliding out of the top opening 222 and disengaging the bellows 206.

Additionally, as seen in FIG. 2D, the filter 228 is positioned within a chamber 232 defined by the top portion 224 of the fitting 204. The filter 228 is positioned between the retaining member 226 and a top end of the top portion 224 of the fitting 204. As a result, the fitting 204 and the suction cup 202 define a passage (e.g., an airflow passage or other fluidflow passage) from the lip 206, through the interior cavity 220, through the retaining member 226, through the filter 228, and out the top portion 224 of the fitting 204. Air that flows upwards through the interior cavity 220 enters the fitting 204 through the retaining member 226. That air is then directed upwards through the filter 228 and out the top portion 224 of the fitting 204. The filter 228 filters particles within that air so that the particles do not continue traveling through the top portion 224 of the fitting 204 and into downstream components of the robotic arm 100. In this manner, the filter 228 protects other components of the robotic arm 100 from clogging or being damaged by these particles.

Additionally, because the filter 228 is positioned within the chamber 232, the filter 228 is protected from damage caused by the operation or movement of the bellows 206. As a result, the life span of the filter 228 is improved. Moreover, the retaining member 226 further protects the filter 228 from being damaged by items or portions of items that are suctioned into the interior cavity 220. As a result, the lifespan of the filter 228 is further improved.

The design of the fitting 204 also makes the filter 228 easy to service or replace. For example, to replace the filter 228 the retaining member 226 may be decoupled from the bottom section 225. A tool may be maneuvered upwards through the interior cavity 220 to grab and pull downwards on the retaining member 226. In some embodiments, the tool may twist the retaining member 226 to decouple the retaining member 226 from the bottom section 225. After the retaining member 226 is decoupled from the top portion 224 and removed from the interior cavity 220, the top portion 224 of the fitting 204 may be lifted out of the interior cavity 220 through the top opening 222 to disengage with the bellows 206. The filter 228 may then be removed from the chamber 232 and replaced with another filter 228. The bottom section 225 may then be inserted through the top opening 222 and into the interior cavity 220. The retaining member 226 may then be maneuvered upwards through the interior cavity 220 and reengaged with the bottom section 225. In this manner, the filter 420 may be removed or replaced without damaging the bellows 206.

In certain embodiments, the retaining member 226 extends from the interior cavity 220 and through the top opening 222. The top portion 224 then engages the retaining member 226 without extending through the top opening 222 or into the interior cavity 220. For example, the top portion 224 or the retaining member 226 may twist onto each other at a location outside the interior cavity 220 and beyond the top opening 222.

The top section 227 may include any suitable mechanism to couple the top section 227 to the end effector 104 or to the robotic arm 100. In some embodiments, the top section 227 includes threads so that the top section 227 may couple to the end effector 104 or the robotic arm 100. The threads may allow the top section 227 to twist to couple to the end effector 104 or to the robotic arm 100.

Figure 2E:
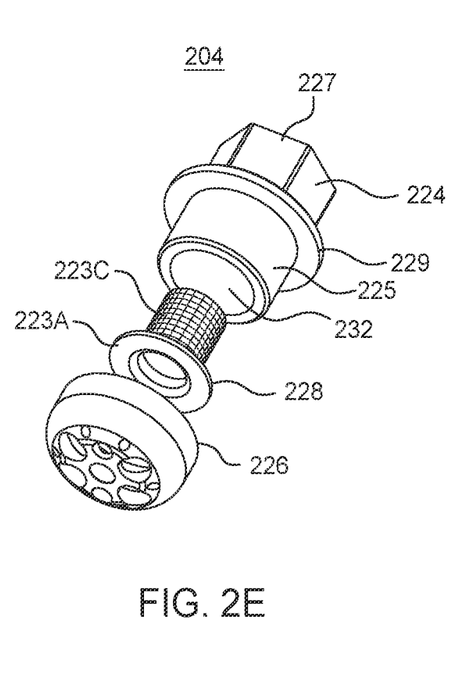
FIGS. 2E through 2H illustrate an example fitting of the suction device of FIGS. 2A through 2D.

FIG. 2E illustrates an exploded isometric view of the fitting 204. As seen in FIG. 2E, the fitting 204 includes the top portion 224, the retaining member 226, and the filter 228. The top portion 224 includes the bottom section 225, the top section 227, and the rim 229. The rim 229 is positioned between the bottom section 225 and the stop section 227. The bottom section 225 is sized to fit through the top opening 222 of the suction cup 202. The rim 229 and/or the top section 227 are sized so that they do not fit through the top opening 222 of the suction cup 202.

Additionally, the top portion 224 of the fitting 204 defines a chamber 232 in which the filter 228 is held. The filter 228 is sized to fit within the chamber 232. As discussed previously, air flows from the retaining member 226 through the chamber 232 and the filter 228. The filter 228 filters particles within that air, so that the particles are not sucked out of the top portion 224 of the fitting 204 and into other components of the robotic arm 100. The flange 223A prevents air from flowing around the side surface 223C and into the chamber 232 when the filter 228 is positioned within the chamber 232. As a result, the flange 223A directs air into and through the filter 228.

Figures 2F, 2G:
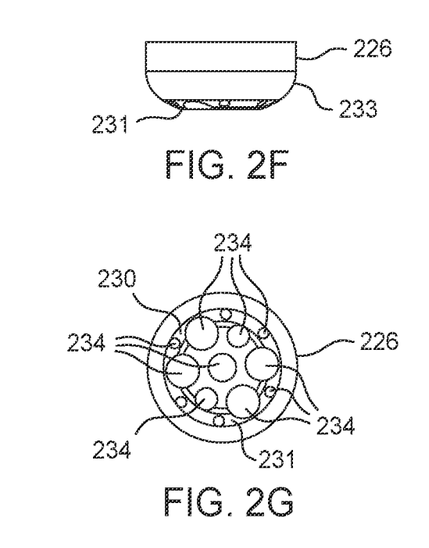
Figure 2H:
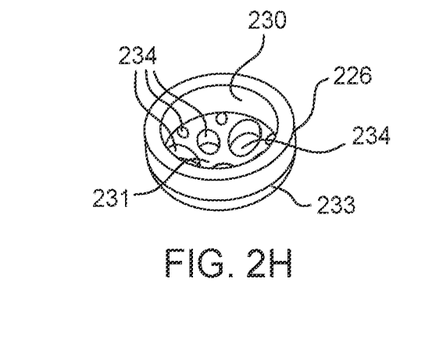

FIGS. 2F through 2H illustrate different views of the retaining member 226. FIG. 2F illustrates a side view of the retaining member 226. FIG. 2G illustrates a top-down view of the retaining member 226. FIG. 2H illustrates an isometric view of the retaining member 226. As seen in these figures, the retaining member 226 defines an inner cavity 230. Additionally, a bottom section 233 of the retaining member 226 is rounded such that when the retaining member 226 is coupled to the top portion 224, the rounded section 233 creates separation between a bottom surface 231 of the retaining member 226 and the bottom section 225 of the top portion 224. This separation makes it more difficult for items (e.g., bags) that are suctioned into the suction cup 202 and through the retaining member 226 to contact and damage the filter 228. In some embodiments, the rounded shape of the retaining member 226 makes it easier to clear debris from the fitting 204 during a blowout cycle. During the blowout cycle, air is blown from the top section 227 of the top fitting 204, through the filter 228, through the retaining member 226, and through the interior cavity 220. This air dislodges and blows debris out the bottom opening 218, which cleans the filter 228 and the air passage within the suction cup 202. The rounded shape of the retaining member 226 improves the flow of the blowout air and makes it easier for debris to be dislodged and blown out the suction cup 202.

Additionally, as seen in these figures the bottom surface 231 of the retaining member 226 defines various apertures 234. The apertures 234 may have different sizes and shapes and may be spaced around the bottom surface 231. The apertures 234 open towards the bottom opening 218 of the interior cavity 220 when the fitting 204 is engaged with the suction cup 202. The apertures 234 allow air to flow upwards through the bottom surface 231 and through the cavity 230. Additionally, the apertures 234 form a grating that prevents items that are suctioned into the interior cavity 220 of the bellows 206 from being further suctioned into the filter 228 and damaging the filter 228. For clarity, not all of the apertures 234 shown in FIGS. 2F through 2H are labeled. Thus, the apertures 234 can operate as a course filter for larger objects, while the filter 228 operates to block smaller particulate from flowing downstream.

In operation, a top end of the fitting 204 can be coupled to a vacuum source (e.g., by a hose in the end effector 104). The vacuum source causes air to flow through a passage starting from the lip 208, through the bottom opening 218 and the interior cavity 220 of the bellows 206, and through the fitting 204. The air that flows through the fitting 204 flows through the retaining member 226, through the chamber 232 and the filter 228, and out the top portion 227. When the lip 208 is seated against an item to form a seal (which may be only partial), this air flow creates a suction effect on the item, which allows the suction device 106 to lift or manipulate the item.

Figure 3A:
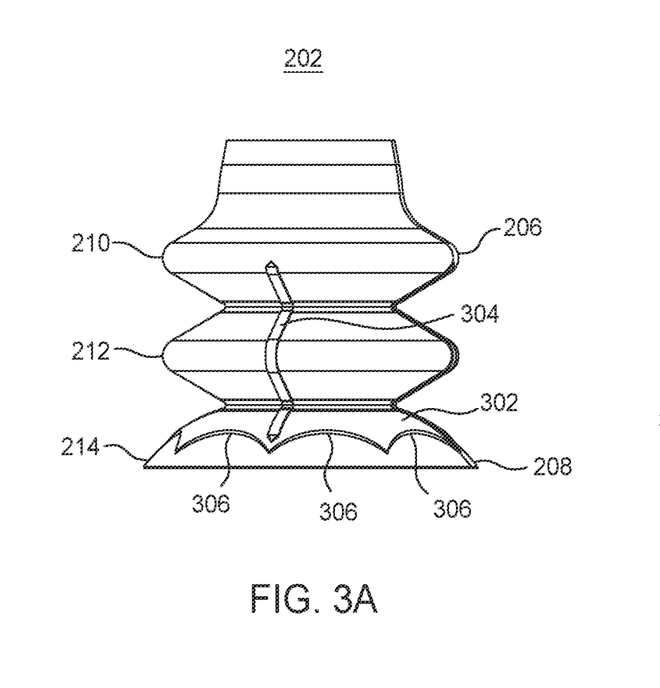
FIGS. 3A through 3D illustrate an example suction cup of the suction device of FIGS. 2A through 2D.

FIG. 3A illustrates an example suction cup 202 of the suction device 106 of FIGS. 2A through 2D. As discussed previously, the suction cup 202 includes a bellows 206 and a lip 208. The bellows 206 includes a top portion 210 and a bottom portion 212. The lip 208 and the top portion 210 are coupled to the bottom portion 212.

As seen in FIG. 3A, a rib 302 is positioned on the outer surface 214 of the lip 208. The rib 302 extends along the outer surface 214 such that the rib 302 extends radially and vertically away from the bottom portion 212. The rib 302 extends around the outer surface 214 such that the rib 302 covers an inner area of the outer surface 214. The lip 208 extends beyond the rib 302 such that portions of the outer surface 214 are not covered by the rib 302. Generally, the rib 302 provides structural support for covered portions of the lip 208. Because of the increased structural support, the lip 208 is less likely to collapse or fold in on itself when the lip 208 is positioned against an item and a suction effect is created.

Additionally, as seen in FIG. 3A the rib 302 is shaped such that the rib 302 forms multiple arcs 306 around the periphery of the rib 302. These arcs 306 may be sized such that the arcs 306 form the periphery of the rib 302. In certain embodiments, the thickness of the rib 302 may change along a radius of the rib 302. For example, portions of the rib 302 that are closer to the bottom portion 212 of the bellows 206 may be thicker than portions of the rib 302 that are further away from the bottom portion 212 of the bellows 206. In this manner, the thickness of the rib 302 tapers along the radius of the rib 302 such that the rib 302 is thinnest at the arcs 306. In this manner, portions of the lip 208 that are further away from the bottom portion 212 of the bellows 206 may be more flexible than portions of the lip 208 that are closer to the bottom portion 212 of the bellows 206. As a result, portions of the lip 208 that are further away from the bottom portion 212 of the bellows 206 may flex or bend to accommodate different sizes and shapes of items while the portions of the lip 208 that are closer to the bottom portion 212 of the bellows 206 may be more rigid to prevent the lip 208 from collapsing or folding in on itself.

Furthermore, multiple ribs 304 are positioned around the suction cup 202. Each rib 304 extends vertically, such that the rib 304 is coupled to the top portion 210 of the bellows 206, the bottom portion 212 of the bellows 206 and the rib 302. The rib 302 may extend beyond the ribs 304. Each rib 304 provides structural support that reduces the likelihood of the bellows 206 collapsing or folding in on itself during operation when a suction effect is created. Additionally, each rib 304 is positioned such that when the top portion 210 and the bottom portion 212 of the bellows 206 compress during operation, the rib 304 contacts itself, which may prevent the top portion 210 of the bellows 206 from contacting the bottom portion 212 of the bellows 206. In this manner, the ribs 304 reduce the likelihood that the top portion 210 of the bellows 206 sticks to the bottom portion 212 of the bellows 206.

Figure 3B:
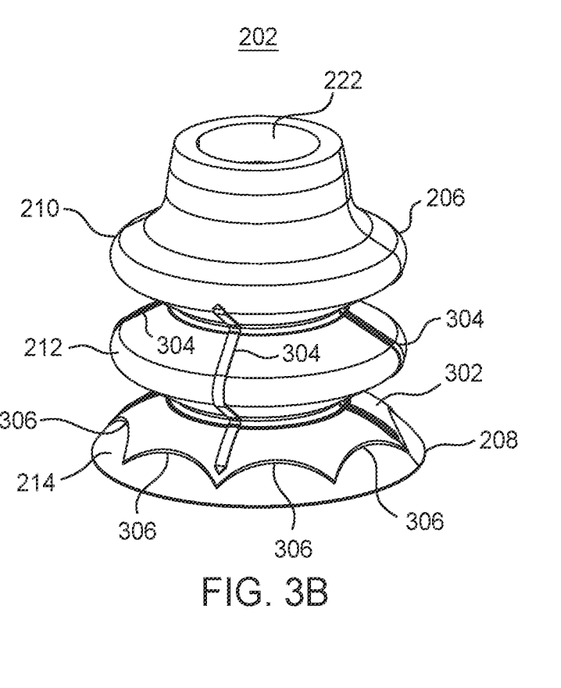

FIG. 3B illustrates an isometric view of the suction cup 202 of FIG. 3A. As seen in FIG. 3B, the rib 302 is positioned on the outer surface 214 of the lip 208 such that the rib 302 extends around a portion of the outer surface 214. The rib 302 extends radially and vertically away from the bottom portion 212 of the bellows 206. The lip 208 extends beyond the rib 302 such that portions of the lip 208 are not covered by the rib 302. Moreover, a periphery of the rib 302 is formed by the arcs 306. In this manner, the rib 302 provides structural support for portions of the lip 208 that are closer to the bottom portion 212 of the bellows 206 while maintaining flexibility for portions of the lip 208 that are further away from the bottom portion 212 of the bellows 206.

Additionally, as seen in FIG. 3B, the ribs 304 are positioned around the bellows 206 and the rib 302. The ribs 304 may be spaced evenly around the bellows 206 and the rib 302. For example, four ribs 304 may be spaced 90 degrees apart around the bellows 206 and the rib 302. Each rib 304 extends along the contours of the bellows 206 and the rib 302 such that the rib 304 couples to the top portion 210 of the bellows 206, the bottom portion 212 of the bellows 206, and the rib 302. The rib 302 may extend beyond each rib 304. As discussed previously, each rib 304 provides structural support that reduces the chances that the bellows 206 will collapse or fold in on itself during a suction operation. Additionally, each rib 304 extends along the contours of the top portion 210 of the bellows 206 and the bottom portion 212 of the bellows 206 such that the ribs 304 contact themselves when the top portion 210 and the bottom portion 212 of the bellows 206 compress during operation, which may prevent the top portion 210 of the bellows 206 from sticking to the bottom portion 212 of the bellows 206 during the suction operation.

Figure 3C:
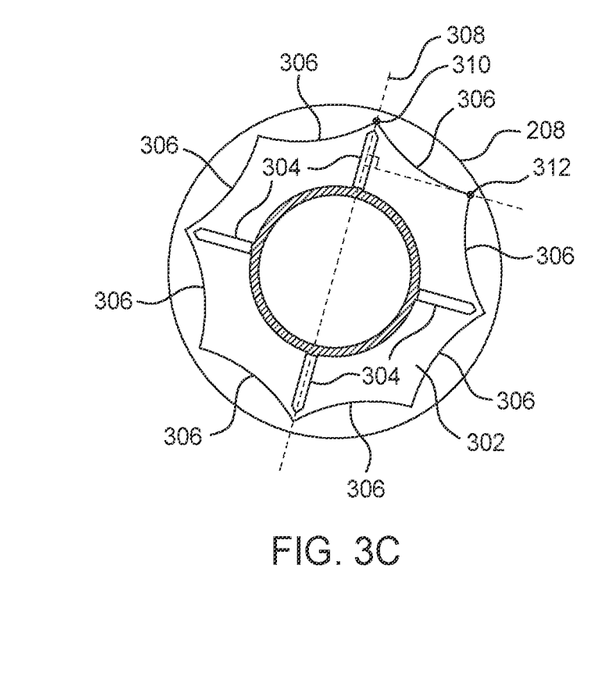

FIG. 3C illustrates a top-down view of the lip 208 of the suction cup 202 of FIG. 3A. As seen in FIG. 3C, the rib 302 extends radially along the lip 208. The lip 208 extends beyond the rib 302. The periphery of the rib 302 is formed using the arcs 306. The ribs 304 extend radially on the rib 302. The rib 302 extends beyond the ribs 304. Additionally, the ribs 304 are spaced evenly around the lip 208. In some embodiments, the ribs 304 are not spaced evenly around the lip 208. Rather, there are different amounts of space between different pairs of ribs 304.

As seen in FIG. 3C, the rib 302 is symmetrical about a midline 308 of the lip 208. Additionally, an arc 306 has an endpoint 310 on the midline 308. This arc 306 has a second endpoint 312. The arc 306 is shaped such that the arc 306 becomes perpendicular to the midline 308 at the second end point 312. In particular embodiments, this arrangement of the arcs 306 makes it easier to manufacture the lip 208 and/or the rib 302. For example, if the lip 208 or the rib 302 are formed in a mold, the shape of the rib 302 and/or the arcs 306 reduce the chances that the rib 302 and/or the lip 208 tear when the rib 306 or the lip 208 are pulled and removed from the mold. Stated differently, because the arc 306 is perpendicular to the midline 308 at the second endpoint 312, the rib 302 or the lip 208 are less likely to tear when being removed from the mold.

Figure 3D:
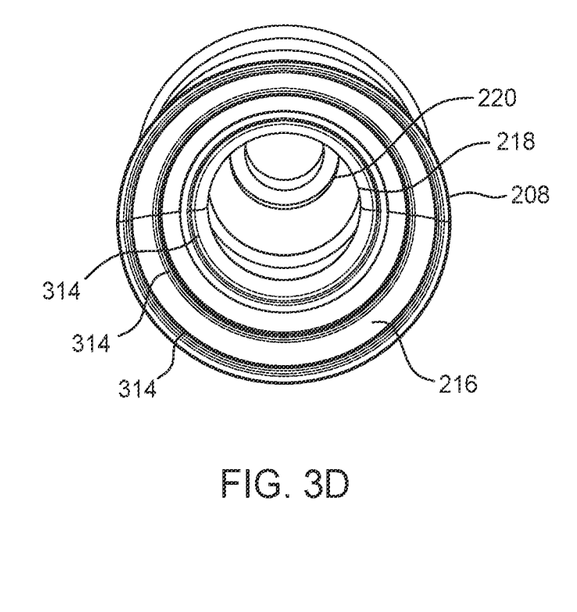

FIG. 3D illustrates a bottom view of an embodiment of the suction cup 202 of the suction device 106. As seen in FIG. 3D, concentric rings 314 may be formed on the object contact surface 216 of the lip 208. Each ring 314 may be a raised surface that reduces the chances of an item disengaging from the object contact surface 216. For example, when the lip 208 is first pressed against an item, an innermost ring 314 may form a seal that creates a suction effect that lifts the item. If that seal is compromised or breaks, a second ring 314 with a larger radius than the innermost ring 314 may catch the item and form a second seal that creates a second suction effect on the item. If the second seal is compromised or breaks, then a third ring 314 with a larger radius than the second ring 314 may catch the item and form a third seal that creates a third suction effect on the item. Any number of concentric rings 314 may be formed on the object contact surface 216. The more rings 314 that are formed, the less likely the item is to disengage from the object contact surface 216. In this manner, the concentric rings 314 make it is less likely for an item to disengage completely from the lip 208.

Figure 3E:
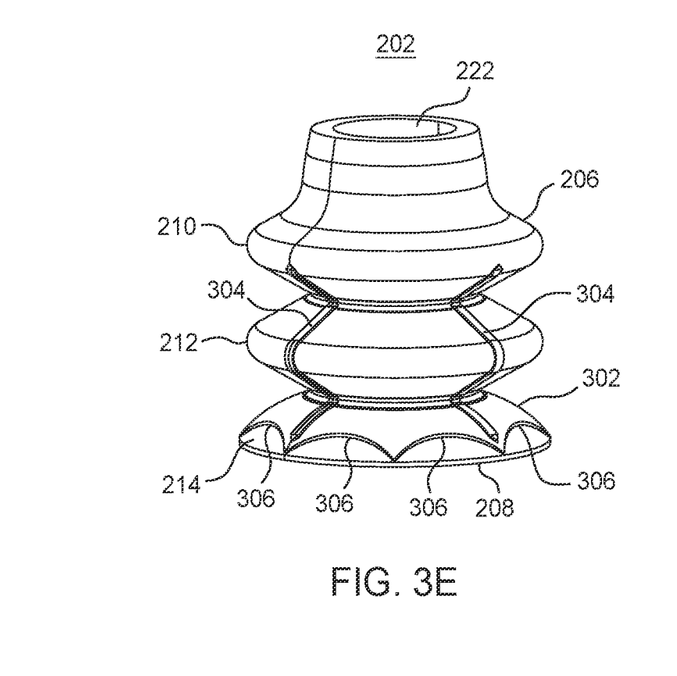
FIGS. 3E and 3F illustrate example suction cups of the suction device of FIGS. 2A through 2D.
Figure 3F:
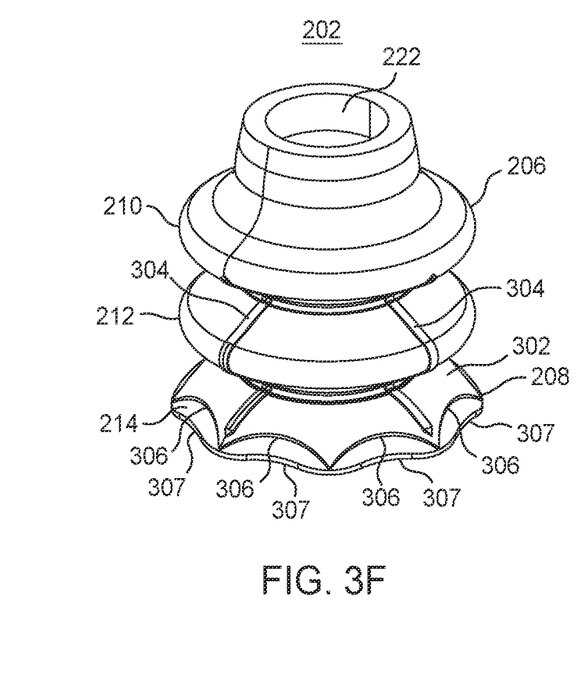

In some embodiments, the rib 302 extends to the periphery of the lip 208. FIG. 3E illustrates an example suction cup 202 of the suction device 106. As seen in FIG. 3E, the rib 302 extends from the bellows 206 in a radial direction and in a vertical direction along the outer surface 214 of the lip 208. The rib 302 extends to the periphery of the lip 208 (e.g., the endpoints of the arcs 306 touch the outer boundary of the lip 208). FIG. 3F illustrates an example suction cup 202 of the suction device 106. As seen in FIG. 3F, the rib 302 extends to the periphery of the lip 208 (e.g., the endpoints of the arcs 306 touch the outer boundary of the lip 208). Additionally, the lip 208 defines arcs 307 around the periphery of the lip 208. The arcs 307 may be smaller than the arcs 306.

Figure 4A:
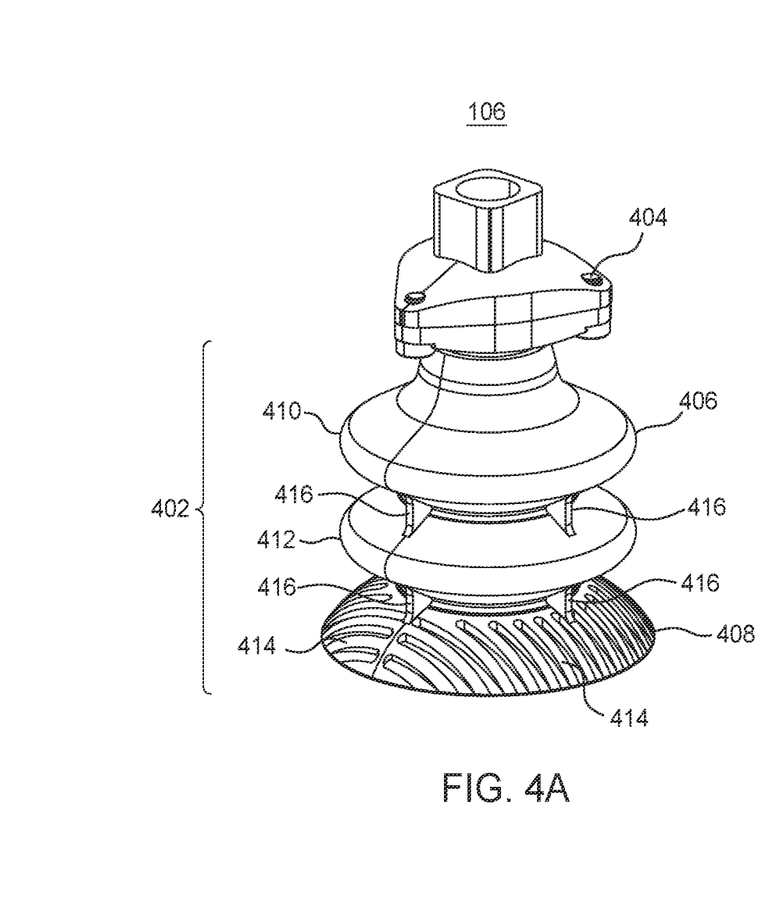
FIGS. 4A and 4B illustrate an example suction device.
Figure 4B:
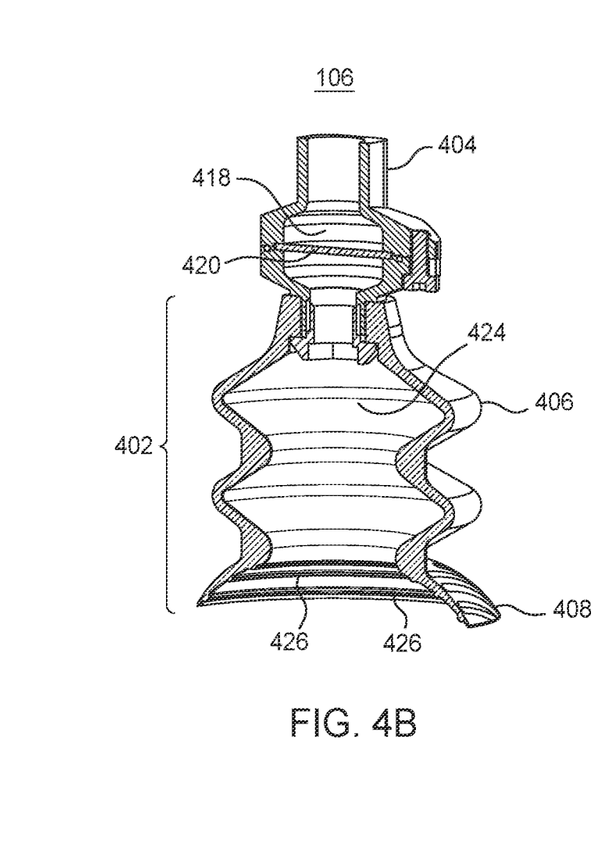

FIGS. 4A and 4B illustrate a second design for the suction device 106 of the robotic arm 100 of FIG. 1. As seen in FIG. 4A, the suction device 106 includes a suction cup 402 and a fitting 404 coupled to the suction cup 402. The suction cup 402 includes a bellows 406 and a lip 408. The bellows 406 includes a top portion 410 and a bottom portion 412. The fitting 404 is coupled to a top end of the top portion 410 of the bellows 406. The bottom portion 412 of the bellows 406 is coupled to the top portion 410 of the bellows 406. The lip 408 is coupled to a bottom end of the bottom portion 412 of the bellows 406.

Multiple ribs 414 are disposed on the lip 408. As seen in FIG. 4A, the ribs 414 extend linearly from a midline of the lip 408. Each rib 414 extends along the contour of the lip 408 to the periphery of the lip 408. The thickness of each rib 414 may taper as the rib 414 extends towards the periphery of the lip 408. The ribs 414 provide structural support to the lip 408 so that the lip 408 does not collapse and fold in on itself during a suction operation. Additionally, as seen in FIG. 4A, each rib 414 is separated from another rib 414 by a space. The space allows a portion of the lip 408 to be flexible so that the lip 408 can form a seal against an item during a suction operation. In this manner, the ribs 414 increase the structural support provided to the lip 408 while still allowing the lip 408 to be flexible enough to form a seal against an item. For clarity, not all of the ribs 414 shown in FIG. 4A are labeled.

Multiple ribs 416 are positioned between the lip 408 and the bottom portion 412 of the bellows 406 and between the bottom portion 412 of the bellows 406 and the top portion 410 of the bellows 406. As seen in FIG. 4A, the ribs 416 are triangular ribs 416 wedged between the lip 408 and the bottom portion 412 of the bellows 406 and between the bottom portion 412 of the bellows 406 and the top portion 410 of the bellows 406. The ribs 416 provide structural support that prevents the bellows 406 from collapsing and folding in on itself during a suction operation. For example, the ribs 416 may resist the top portion 410 of the bellows 406 from collapsing into the bottom portion 416 of the bellows 406 and the bottom portion 412 of the bellows 406 from collapsing into the lip 408. The ribs 416 may be spaced evenly around the suction device 106. Any number of ribs 416 may be disposed on the suction device 106.

FIG. 4B illustrates a cross-sectional view of the suction device 106 of FIG. 4A. As seen in FIG. 4B, the fitting 404 defines a chamber 418. A filter 420 is positioned within the chamber 418. The fitting 404 extends through the top portion 410 of the bellows 406 and into an interior cavity 424 defined by the bellows 406. The top end of the fitting 404 may couple to a vacuum that causes air to flow from the lip 408 up through the interior cavity 424 and through the fitting 404. As the air passes through the filter 420, the filter 420 catches particles in the air and removes these particles from the air so that the particles do not travel into the vacuum or into other parts of the robotic arm 100. For example, the filter 420 may catch particles dislodged from an item by the suction effect created by the vacuum and the lip 408. In this manner, the filter 420 protects the vacuum and the robotic arm 100 from being clogged or damaged by these dislodged particles.

As seen in FIG. 4B, the filter 420 is positioned in the chamber 418 rather than in the interior cavity 424 of the bellows 406. As a result, the filter 420 is protected from damage caused by the operation and movement of the bellows 406. Additionally, the fitting 404 makes it easier to service or replace the filter 420. For example, screws in the fitting 404 may be removed to open the fitting 404 and to expose the chamber 418. The filter 420 may then be removed and replaced by another filter 420. The fitting 404 may then be reassembled and the screws reinserted to close the fitting 404 and the chamber 418. In this manner, the filter 420 may be removed or replaced without damaging the bellows 406.

Moreover, the lip 408 includes concentric rings 426 formed on an object contact surface of the lip 408. These concentric rings 426 may be pressed against an item to form a seal on the item. The seal may allow a suction effect to be created on the item, which allows the suction device 106 to lift or manipulate the item. A ring 426 with the smallest diameter may first be pressed against an item to form a seal against the item. If this seal were to break during operation, the item may fall and the next ring 426 may catch the item and form a seal against the item. In this manner, the rings 426 make it more difficult for an item to disengage fully from the suction device 106 and fall.

Figure 5A:
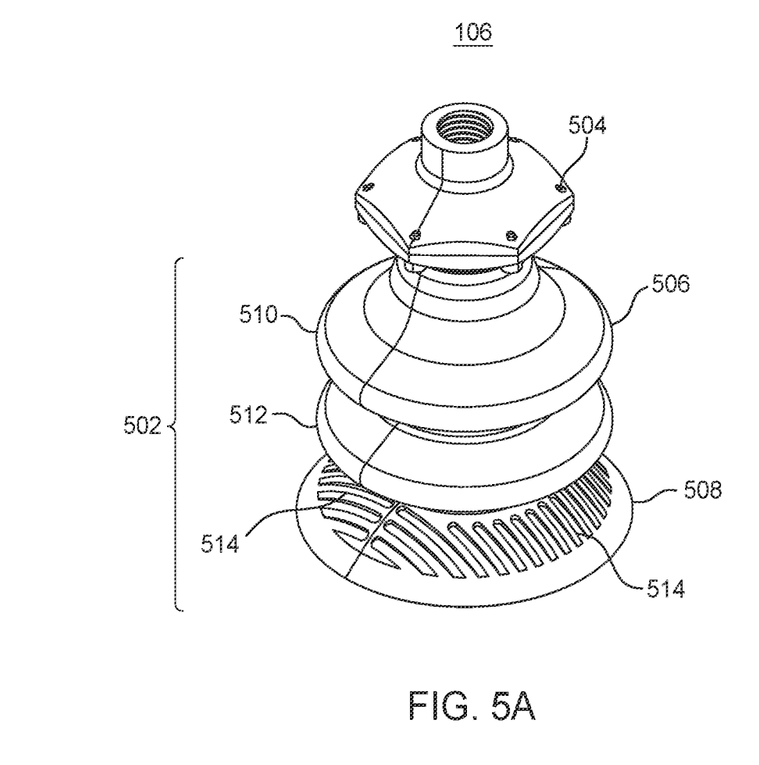
FIGS. 5A and 5B illustrate an example suction device.
Figure 5B:
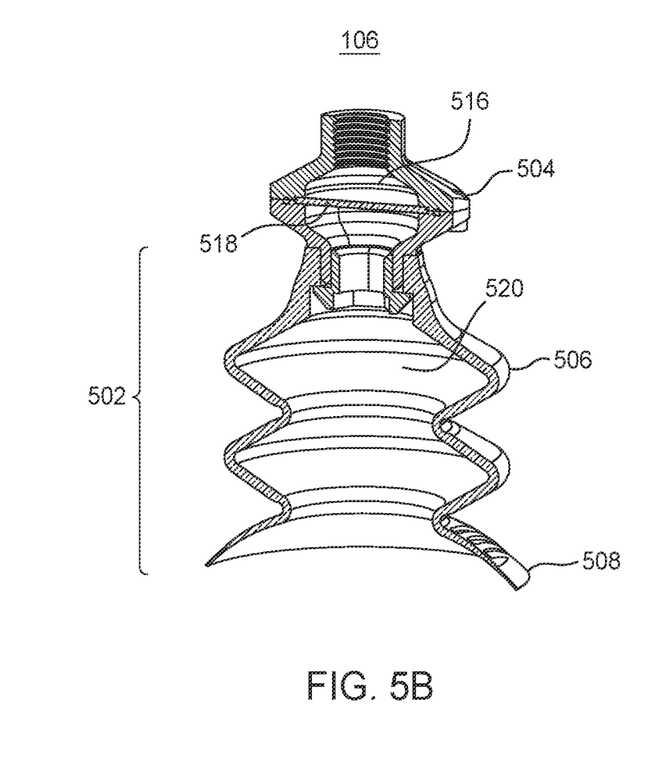

FIGS. 5A and 5B illustrate a third design for the suction device 106 of the robotic arm 100 of FIG. 1. As seen in FIG. 5A, the suction device 106 includes a suction cup 502 and a fitting 504. The suction cup 502 includes a bellows 506 and a lip 508. The bellows 506 includes a top portion 510 and a bottom portion 512. The fitting 504 couples to a top end of the top portion 510 of the bellows 506. The bottom portion 512 couples to the top portion 510 of the bellows 506. The lip 508 couples to a bottom end of the bottom portion 512 of the bellows 506.

Multiple ribs 514 are disposed on the lip 508. The ribs 514 extend linearly from a midline of the lip 508. The ribs 514 do not extend to the periphery of the lip 508. Each rib 514 has a thickness that may taper along the length of the rib 514. As a result, the ribs 514 provide structural support for the lip 508 so that the lip 508 does not collapse and fold in on itself during a suction operation. Additionally, each rib 514 is separated from another rib 514 by a space. These spaces allow the lip 508 to maintain some flexibility so that the lip 508 may conform to the surface of an item and to form a seal against that item. As a result, the ribs 514 allow the lip 508 to maintain flexibility to form seals while providing structural support that prevents the lip 508 from collapsing and folding in on itself. For clarity, not all of the ribs 514 shown in FIG. 5A are labeled.

FIG. 5B illustrates a cross-sectional view of the suction device 106 of FIG. 5A. As seen in FIG. 5B, the fitting 504 defines a chamber 516. A filter 518 is positioned within the chamber 516. The fitting 504 extends through a top end of the top portion 510 of the bellows 506 and into an interior cavity 520 defined by the bellows 506. When the top end of the fitting 504 is coupled to a vacuum, the vacuum causes air to flow from the lip 508, up through the interior cavity 520, and through the fitting 504. When the air flows through the filter 518, the filter 518 captures particles in the air so that the particles do not travel into the vacuum and other components of the robotic arm 100. In this manner, the filter 518 protects the vacuum and the robotic arm 100 from being clogged or damaged by particles that are dislodged from an item during a suction operation.

Additionally, due to the design of the fitting 504, it is easier to service or replace the filter 518. For example, screws may be removed from the fitting 504, so that the fitting 504 may be opened to expose the chamber 516. The filter 518 may then be removed and replaced with a new filter 518. The fitting 504 may then be reassembled and the screws reinserted to close the chamber 516. In this manner, the filter 518 may be removed or replaced without damaging the bellows 506.

Figure 6A:
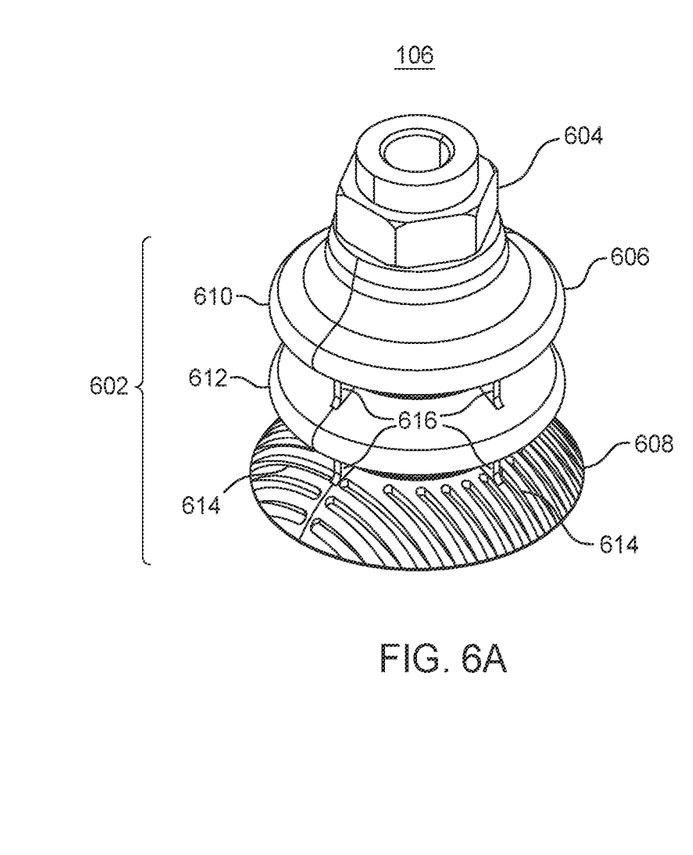
FIGS. 6A and 6B illustrate an example suction device.
Figure 6B:
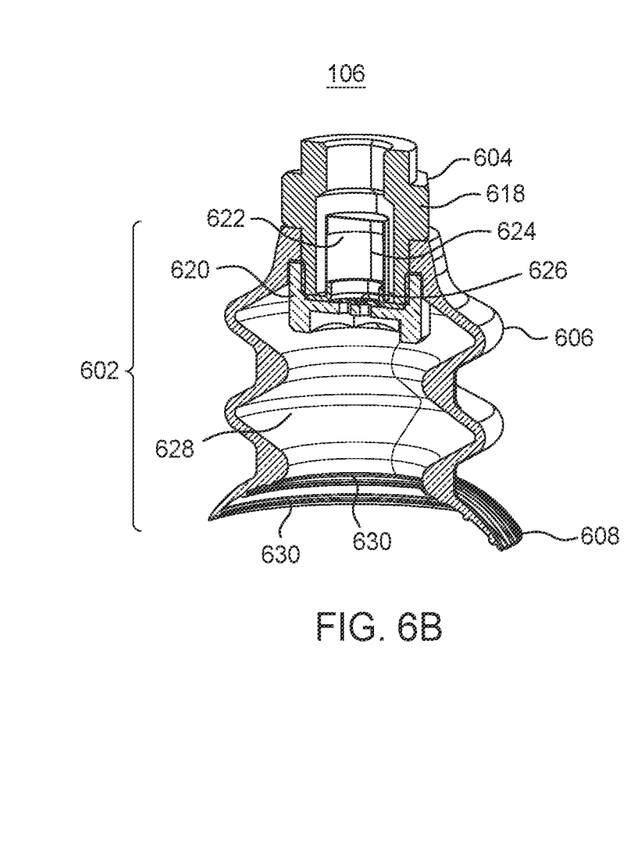

FIGS. 6A and 6B illustrate a fourth design for the suction device 106 of the robotic arm 100 of FIG. 1. As seen in FIG. 6A, the suction device 106 includes a suction cup 602 and a fitting 604. The suction cup 602 includes a bellows 606 and a lip 608. The bellows 606 include a top portion 610 and a bottom portion 612. The fitting 604 couples to a top end of the top portion 610 of the bellows 606. The bottom portion 612 couples to the top portion 610 of the bellows 606. The lip 608 couples to a bottom end of the bottom portion 612 of the bellows 606.

Multiple ribs 614 are disposed on the lip 608. As seen in FIG. 6A, the ribs 614 extend linearly from a midline of the lip 608. Each rib 614 has a thickness that may taper along the length of the rib 614. Moreover, each rib 614 is separated from another rib 614 by a space. In this manner, the ribs 614 provide structural support to the lip 608 so that the lip 608 does not collapse or fold in on itself during a suction operation while maintaining flexibility so that the lip 608 may conform to the surface of an item to create a seal.

Multiple ribs 616 are positioned around the suction device 106. As seen in FIG. 6A, the ribs 616 are triangular ribs 616 wedged between the top portion 610 of the bellows 606 and the bottom portion 612 of the bellows 606 and between the bottom portion 612 of the bellows 606 and the lip 608. The ribs 616 may be spaced evenly around the suction device 106. Each rib 616 may provide structural support that prevents the bellows 606 from collapsing or folding in on itself during a suction operation. For example, the ribs 616 positioned between the top portion 610 and the bottom portion 612 may prevent the top portion 610 of the bellows 606 from collapsing into the bottom portion 612 of the bellows 606. The ribs 616 positioned between the bottom portion 612 of the bellows 606 and the lip 608 may prevent the bottom portion 612 of the bellows 606 from collapsing into the lip 608.

FIG. 6B illustrates a cross-sectional view of the suction device 106 of FIG. 6A. As seen in FIG. 6B, the fitting 604 includes a top portion 618 and a bottom portion 620. Additionally, the fitting 604 defines a chamber 622. A filter 624 is positioned within the chamber 622. The top portion 618 of the fitting 604 extends through a top end of the top portion 610 of the bellows 606 and into an interior cavity 628 defined by the bellows 606. The bottom portion 620 of the fitting 604 is sized to fit through a bottom opening of the suction cup 602 and into the interior cavity 628. The bottom portion 620 then engages and couples to the top portion 618 of the fitting 604 to prevent the top portion 618 of the fitting 604 from disengaging the bellows 606. As seen in FIG. 6B, the top portion 618 is sized to span a width of a top end of the bellows 606 and the bottom portion 620 is sized to span a width of the interior cavity 628 that is larger than the width of the top end of the bellows 606. When the bottom portion 620 is coupled to the top portion 618, the bottom portion 620 prevents the top portion 618 from being dislodged or disengaging the bellows 606.

A top end of the fitting 604 may be coupled to a vacuum that causes air to flow from the lip 608 up through the interior cavity 628 and through the fitting 604. When the air flows through the chamber 622, the filter 624 may catch particles in the air so that the particles do not continue traveling into the vacuum and into other parts of the robotic arm 100. In this manner, the filter 624 protects the vacuum and other parts of the robotic arm 100 from being clogged or damaged by particles dislodged from items by the suction effect.

Additionally, the fitting 604 makes it easier to service or replace the filter 624. For example, a tool may be used to grab and decouple the bottom portion 620 from the top portion 618 of the fitting 604. After the bottom portion 620 is decoupled from the top portion 618, the top portion 618 of the fitting 604 may be dislodged or disengaged from the bellows 606. The filter 624 may then be removed from the chamber 622 and replaced with a new filter 624. The top portion 618 may then be reinserted into the bellows 606. The bottom portion 620 may then be reengaged with a top portion 618 to secure the top portion 618 to the bellows 606.

As seen in FIG. 6B, multiple concentric rings 630 are positioned on the lip 608. The rings 630 form seals against an item to create a suction effect. The rings 630 make it more difficult for the item to completely disengage from the suction device 106 and fall. For example, a ring 630 with the smallest diameter may first engage the item and form a seal against the item. If that seal breaks and the item falls, the ring 630 with the next largest diameter may catch the item and form a seal against the item.

In summary, this disclosure describes a suction device 106 for a robotic arm 100 with one or more features that improve the longevity of the suction device 106. The suction device 106 includes a fitting 204 coupled to the top portion of a suction cup 202. A filter 228 is positioned within a chamber 232 in the fitting 204. When the suction effect is created, air flows from the suction cup 202 and through the fitting 204. The air flowing through the fitting 204 flows through the chamber 232 and the filter 228. In this manner, the fitting 204 protects the filter 228 from being damaged by the suction cup 202 or by items being suctioned by the suction cup 202. Additionally, the filter 228 catches particles dislodged from the items by the suction effect.

Moreover, the suction device 106 includes a rib 302 on a lip 208 of the suction cup 202 and/or ribs 304 on a bellows 206 of the suction cup 202. The rib 302 on the lip 208 of the suction cup 202 extends around an inner area of the lip 208 to strengthen the lip 208 against collapse. The lip 208 may extend beyond the rib 302 to allow for flexibility at the boundary of the lip 208 so that the suction cup 202 can adhere to various types of items. The ribs 304 on the bellows 206 of the suction cup 202 extend vertically down the bellows 206 and onto the rib 302 on the lip 208. These ribs 304 strengthen the bellows 206 against collapse. Additionally, these ribs 304 may prevent the bellows 206 from contacting and sticking to itself during a suction operation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

While the foregoing is directed to embodiments of the present invention, other and further embodiments of the invention may be devised without departing from the basic scope thereof, and the scope thereof is determined by the claims that follow.

What is claimed is:

1. A suction cup configured to couple to an end effector of a robotic arm, the suction cup comprising:
   a bellows comprising a top portion and a bottom portion, the top portion and the bottom portion of the bellows defines an interior cavity;
   a lip coupled to the bottom portion of the bellows, the lip extends away from the bottom portion of the bellows in a radial direction and in a vertical direction such that the lip forms a cup shape, the lip comprising an object contact surface and an outer surface opposite the object contact surface, wherein:

the bellows and the lip define a passage from the object contact surface through the interior cavity;

the lip comprises a first rib on the outer surface of the lip, the first rib extends along the outer surface of the lip in the radial direction and in the vertical direction;

the lip extends from the bottom portion of the bellows beyond the first rib; and a thickness of the first rib tapers along the radial direction to resist the lip folding during a suction operation; and a plurality of ribs, wherein each rib of the plurality of ribs extends in the vertical direction on the top portion of the bellows, on the bottom portion of the bellows, and on the first rib, wherein the first rib extends along the outer surface of the lip beyond the plurality of ribs, and wherein the plurality of ribs prevent the top portion of the bellows from contacting the bottom portion of the bellows when the bellows compresses during the suction operation.

2. The suction cup of claim 1, wherein the plurality of ribs are spaced evenly around a circumference of the bellows.

3. The suction cup of claim 1, wherein the first rib comprises a plurality of arcs formed around an outer edge of the first rib.

4. The suction cup of claim 3, wherein a first arc of the plurality of arcs is orthogonal to a midline of the first rib at an endpoint of the first arc.

5. A suction cup comprising:

a bellows defining an interior cavity;

a lip coupled to the bellows such that the lip is concentric with the bellows, the lip extends away from the bellows in a radial direction and in a vertical direction such that the lip forms a cup shape, wherein:

the bellows and the lip define a passage from the lip through the interior cavity; and the lip comprises a rib on an outer surface of the lip such that the rib extends along the outer surface of the lip and away from the bellows in the radial direction and in the vertical direction, wherein the rib comprises a plurality of arcs formed around an outer edge of the rib.

6. The suction cup of claim 5, wherein a first arc of the plurality of arcs is orthogonal to a midline of the rib at a first endpoint of the first arc.

7. The suction cup of claim 6, wherein a second endpoint of the first arc is on the midline of the rib.

8. The suction cup of claim 6, wherein the rib is symmetric about the midline of the rib.

9. The suction cup of claim 5, further comprising a plurality of concentric rings disposed on the lip and within the passage.

10. The suction cup of claim 5, wherein a thickness of the rib tapers along the radial direction to resist the lip folding during a suction operation.

11. The suction cup of claim 5, further comprising a plurality of ribs positioned on the bellows and the rib such that the plurality of ribs extend in the vertical direction on the bellows and on the rib.

12. The suction cup of claim 5, wherein the lip extends from the bellows beyond the rib.

13. A suction cup comprising:

a bellows comprising a first portion and a second portion coupled to the first portion, wherein the first portion and the second portion define an interior cavity;

a lip coupled to the second portion of the bellows such that the lip is concentric with the second portion of the bellows, the lip extends away from the bellows in a radial direction and in a vertical direction such that the lip forms a cup shape, wherein the bellows and the lip define a passage from the lip through the interior cavity; and a plurality of ribs, wherein each rib of the plurality of ribs extends in the vertical direction on the first portion of the bellows, on the second portion of the bellows, and on the lip.

14. The suction cup of claim 13, wherein the plurality of ribs extend in the vertical direction along an outer surface of the first portion of the bellows and an outer surface of the second portion of the bellows.

15. The suction cup of claim 14, wherein the plurality of ribs prevent the first portion of the bellows from contacting the second portion of the bellows when the bellows compresses.

16. The suction cup of claim 13, wherein the plurality of ribs are spaced evenly around a circumference of the bellows.

17. The suction cup of claim 13, wherein the lip comprises a first rib on an outer surface of the lip such that the first rib extends along the outer surface of the lip and away from the bellows in the radial direction and in the vertical direction.

18. The suction cup of claim 17, wherein each rib of the plurality of ribs extends in the vertical direction on the first rib.

19. The suction cup of claim 13, wherein the lip extends from the bellows beyond the plurality of ribs.

* * * * *